3,466,286
PYRIMIDINE DYESTUFFS

Jakob Benz, Muenchenstein, and August Schweizer, Muttenz, Switzerland, assignors to Sandoz Ltd., Basel, Switzerland, a Swiss firm
No Drawing. Continuation of application Ser. No. 462,036, June 7, 1965. This application Apr. 29, 1968, Ser. No. 725,224
Claims priority, application Switzerland, May 28, 1958, 59,953/58
Int. Cl. C07d 51/42; D06p 1/20
U.S. Cl. 260—256.5          8 Claims

ABSTRACT OF THE DISCLOSURE

Tri-halopyrimidine-containing water-soluble anthraquinone dyestuffs are disclosed. The dyestuffs may be used on natural and synthetic fibers, and they possess good fastness characteristics.

CROSS-REFERENCES TO RELATED APPLICATIONS

This is a continuation of Ser. No. 462,036, filed on June 7, 1965 and now abandoned, which in turn is a division of Ser. No. 813,681, filed on May 18, 1959 and now abandoned.

It is known that water-soluble dyestuffs which contain at least one exchangeable hydrogen atom can be reacted in aqueous solution with six-membered triazine compounds containing at least two but not more than three exchangeable halogen atoms combined with carbon atoms. Depending upon the di- or trihalogeno-triazine chosen and the conditions of reactions, 1 or 2 halogen atoms of the triazine can be exchanged for radicals of the dyestuff molecule. It is also known that the remaining halogen atoms can be further reacted with compounds containing hydroxyl and amino groups, e.g. ammonia, methylamine, aniline, phenol or cellulose.

It has now been found that valuable new pyrimidine dyestuffs are obtained when water-soluble organic dyestuffs containing at least one exchangeable hydrogen atom in the molecule are reacted with 2.4.5.6-tetrahalogenopyrimidine in such a manner that the reaction product contains at least one trihalogenated pyrimidine ring.

The preferred 2.4.5.6-tetrahalogenopyrimidines are 2.4.5.6-tetrachloropyrimidine and 2.4.5.6-tetrabromopyrimidine. Exchangeable hydrogen atoms of primary interest in this connection are those of the hydroxy and thiol groups or, preferably, those of the amino group which may be monosubstituted by alkyl, hydroxyalkyl, alkoxyalkyl and halogenalkyl radicals.

In the operation of the process, in which dyestuffs containing at least one exchangeable hydrogen atom are reacted with 2.4.5.6-tetrahalogenopyrimidine, the amino group is of special importance as a donor of exchangeable hydrogen atoms on account of its high reactivity.

Noteworthy dyestuffs of this type are, for example, water-soluble aminoanthraquinone dyestuffs.

Further dyestuffs suitable for the reaction with 2.4.5.6-tetrahalogenopyrimidine are those containing at least one reactive hydroxy group and those containing one reactive amino group which may be monosubstituted and one reactive hydroxy group. The amino group and the hydroxy group can be directly bound to aromatic nuclei of the dyestuff molecule or they can be indirectly attached to the dyestuff molecule over an aliphatic chain and if desired a bridge member. Noteworthy aliphatic chains are e.g.

—CH$_2$—, —CH$_2$—CH$_2$—, —CH$_2$—CH$_2$—CH$_2$—, —CH$_2$—CH—
                                                        |
                                                       CH$_3$ and

—CH$_2$—CH$_2$—CH$_2$—CH$_2$—

Representative members of the bridge members are

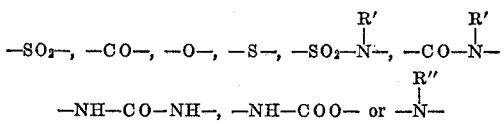

in which R' stands for hydrogen, low molecular alkyl or hydroxyalkyl, cycloalkyl, aryl or aralkyl, and R" stands for an acyl radical.

The aminoanthraquinones employed in this process contain at least two sulfonic acid groups.

Their condensed amino group is attached to the anthraquinone radical through a bridge member, for example an aromatic nucleus. The anthraquinone dyestuffs may conform, for example, to the following general formula:

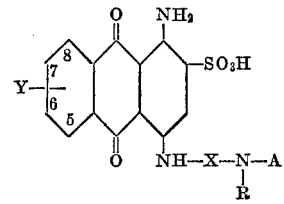

wherein:

A stands for a trihalogenopyrimidine radical,
R stands for hydrogen or a low molecular alkyl radical,
X stands for a bridge member which may contain water-solubilizing groups, e.g.

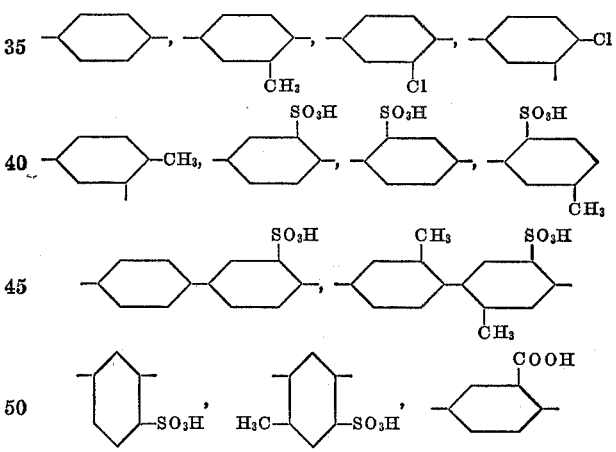

and

Y for hydrogen, halogen or a sulfonic acid group, of which the halogen atom can occupy the 6 or 7 position and the sulfonic acid group one of the positions 5, 6, 7 or 8.

The reaction with 2.4.5.6-tetrahalogenopyrimidine of the water-soluble dyestuffs used as starting materials is conducted preferably in aqueous medium. The halide can be applied in concentrated form or dissolved in an organic solvent. Solvents specially suitable for halogenopyrimidines are acetone, benzene, chlorobenzene and toluene.

The temperature of reaction is governed by the reactivity of the individual starting materials. If temperatures higher than about 40° C. are necessary, it is advisable in view of the volatility of halogenopyrimidines in water-steam to work with vessels fitted with reflux condensers.

The reaction is carried out in a weakly alkaline, neutral or weakly acid medium preferably in the pH range of 9 to 3. To neutralize the hydrogen halide so formed an acid-binding agent, e.g. sodium acetate, is added to the reaction solution at the start of the operation, or, if preferred, small portions of sodium or potassium carbonate or sodium or potassium bicarbonate in solid powdered form or as a concentrated aqueous solution are added in the course of the reaction. Aqueous solutions of sodium or potassium hydroxide are other suitable neutralizing agents. The addition of small amounts of a wetting or emulsifying agent to the reaction mixture can accelerate the rate of reaction.

The reaction is so controlled that only one halogen atom of the 2.4.6.7-tetrahalogenopyrimidine reacts with an exchangeable hydrogen atom. Hitherto it has not been possible to determine which of the halogen atoms participates in the reaction or whether it is equally probable that any one of the isomeric forms will be formed.

On completion of condensation, the pyrimidine dyestuff is precipitated from the solution or suspension, which may be previously neutralized, with sodium or potassium chloride or with acid, whereupon it is filtered with suction, washed and dried.

The water-soluble dyestuffs of the invention, which contain at least one trihalogenated pyrimidine ring, are suitable for the dyeing, padding and printing of fibers of animal origin, e.g. wool and silk, of synthetic polyamide fibers, e.g. nylon, of leather, of cellulose fibers, e.g. cotton, linen, and of regenerated cellulose fibers, e.g. viscose and cuprammonium rayon, as well as for mixtures of these fibers and materials in other forms. The optimum conditions of application vary depending on the type of fiber and the dyestuffs used.

The dyestuffs are dyed, padded, printed or fixed on cellulose fibers preferably in an alkaline medium, e.g. in presence of sodium carbonate or bicarbonate, sodium or potassium hydroxide solution, sodium metasilicate, sodium borate, trisodium phosphate, ammonia, etc. It is often an advantage to add a mild oxidizing agent such as sodium 1-nitrobenzene-3-sulfonate to the dyebath, padding liquor or printing paste, in order to preclude reduction effects. Normally, the dyestuffs are fixed on cellulosic fibers by heat treatment. Some of the dyestuffs which are combined through an oxygen atom to the trihalogenopyrimidine ring can be dyed or fixed at lower temperatures, e.g. 20–40° C., by using sufficiently strong alkalis such as sodium or potassium hydroxide or trisodium phosphate.

The dyeings and prints on cellulose fibers are notable for their excellent fastness to wet agencies, which is due to the formation of a stable chemical linkage between the dyestuffs molecule and the cellulose molecule. Often the total amount of dyestuff applied does not take part in the reaction with the fiber and in such cases the unreacted dyestuff is removed from the fiber by suitable after treatments, e.g. washing and/or soaping, if necessary at higher temperatures. For this purpose synthetic detergents can be used, e.g. alkylarylsulfonates, sodium lauryl sulfate, sodium lauryl polyglycol ether sulfate and mono- and dialkylphenylpolyglycol ethers.

Animal and synthetic polyamide fibers are dyed and printed, or fixed, preferably in an acid, neutral or weakly alkaline medium, e.g. in presence of acetic, formic or sulfuric acid, ammonium sulfate, sodium metaphosphate, etc. Dyeing can also be carried out in an acetic acid to neutral medium in presence of levelling agents, e.g. polyoxethylated fatty amines or mixtures of the same and alkylpolyglycol ethers, the bath being adjusted to a weakly alkaline reaction on completion of dyeing with small amounts of an agent of alkaline reaction, e.g. ammonia, sodium bicarbonate or carbonate etc. or of compounds which react alkaline on heating, e.g. hexamethylene tetramine or urea. This is followed by thorough rinsing and acidifying with a little acetic acid if necessary.

In the dyeing and printing of fibers and other materials of animal origin and synthetic polyamides the linkage between the dyestuff molecule and the fiber is often less pronounced, due to the fact that some of the dyestuffs owing to their acidic character possess affinity for the fiber.

In the following examples the parts and percentages are by weight and the temperatures in degrees centigrade.

EXAMPLE 1

57 parts of 1-amino-4-(4'-amino)-phenylamino-anthraquinone-2.6.3'-trisulfonic acid are dissolved in 600 parts of water with the addition of a 30% sodium hydroxide solution to give a neutral reaction. After the addition of 33 parts of 2.4.5.6-tetrachloropyrimidine the reaction mixture is stirred for 30 hours at 80–90° with reflux condensation and controlled addition of a dilute sodium hydroxide solution to given a constant weakly acid reaction. The solution is subsequently boiled without reflux condensation in order to eliminate the excess tetrachloropyrimidine. By the addition of potassium chloride the dyestuff is precipitated, filtered with suction and dried with vacuum. On grinding it is obtained as a dark powder which dissolves in water to give blue solutions.

Mercerised cotton sateen is printed with a paste of the following composition:

| | Parts |
| --- | --- |
| Dyestuff | 20 |
| Urea | 100 |
| Water | 392 |
| 4% sodium alginate thickening | 450 |
| Sodium 1-nitrobenzene-3-sulfonate | 15 |
| Calcined sodium carbonate | 20 |
| 30% sodium hydroxide | 3 |
| | 1000 |

The dried goods are steamed for 10 minutes at 100°, rinsed in cold and warm water, soaped at the boil for 15 minutes and rinsed again in warm and cold water. A brilliant blue print with very good light and wet fastness is obtained.

If in the above example the 57 parts of 1-amino-4-(4' - amino) - phenylaminoanthraquinone - 2.6.3' - trisulfonic acid are replaced by 49 parts of 1-amino-4-(4'-amino) - phenylaminoanthraquinone - 2.7 - disulfonic acid or by 65 parts of 1 - amino - 4 - [4' - (4' - amino)-phenyl] - phenylaminoanthraquinone - 2.6.3''- or 2.7.3''-trisulfonic acid, blue or greenish blue dyestuffs with excellent fastness properties are obtained.

The following table contains formulae of further dyestuffs (numbered 2 to 10) which are obtainable according to the details of Example 1. In this table A represents the trichloropyramidyl radical and B the tribromopyrimidyl radical:

(2)
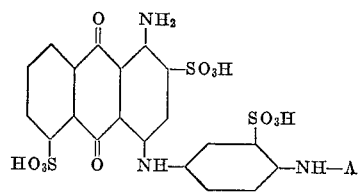

(3)
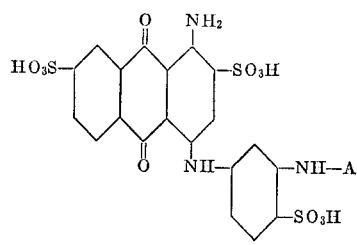

(4) 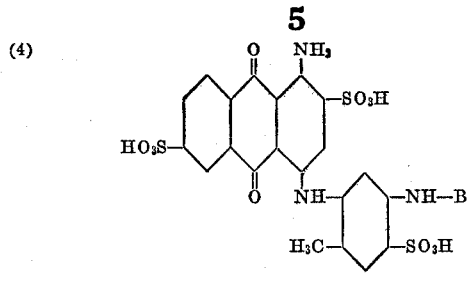

(5) 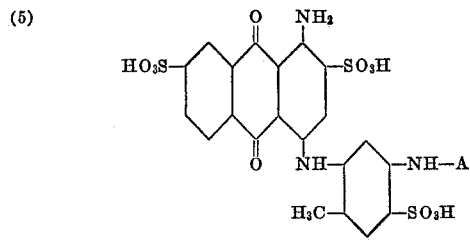

(6) 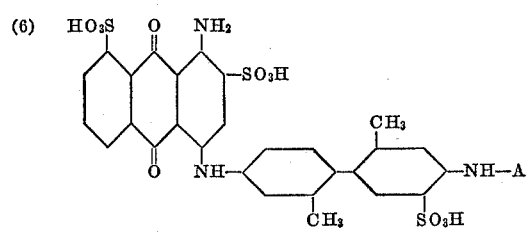

(7) 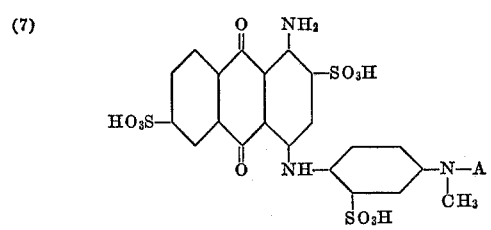

(8) 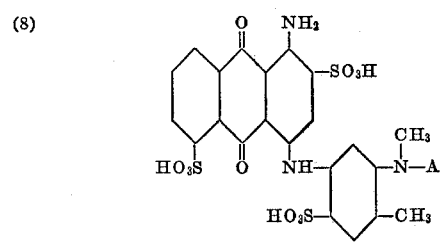

(9) 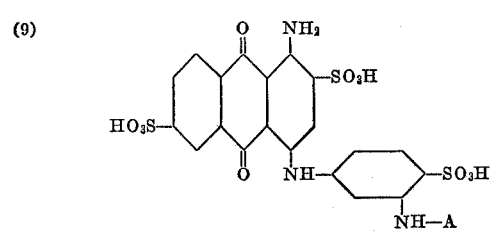

(10) 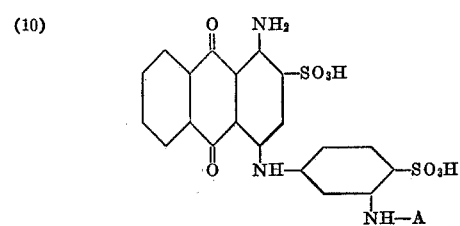

The dyeings on cotton obtained with the dyestuffs Nos. 2 to 10 have the following shades.

| Shade: | Dyestuff No. |
|---|---|
| Blue | 2 |
| Reddish blue | 3 |
| Reddish blue | 4 |
| Reddish blue | 5 |
| Blue | 6 |
| Blue | 7 |
| Reddish blue | 8 |
| Blue | 9 |
| Reddish blue | 10 |

What is claimed is:

1. A water-soluble organic dyestuff constituted by (A) one trihalogenopyrimidyl residue of 2,4,5,6-tetrahalogenopyrimidine selected from the group consisting of trichloropyrimidyl and tribromopyrimidyl residues, (B) a dyestuff radical selected from the group consisting of radicals of 1-amino-2-sulfo-4-arylaminoanthraquinone bearing as sole further substituents at most one to two sulfonic acid groups, and wherein the aryl is from mononuclear to binuclear, and (C) a divalent bridge member selected from the group consisting of —NH— and

said bridge member being connected with one of its free valences to (A) in replacement of one of the four halogen atoms of said 2,4,5,6-tetrahalogenopyrimidine and with its other valence to a carbon atom of the aryl nucleus of the dyestuff radical (B).

2. A water-soluble organic dyestuff constituted by (A) one trichloropyrimidyl residue of 2,4,5,6-tetrachloropyrimidine, (B) the radical of 1-amino-2-sulfo-4-arylamino-anthraquinone bearing as sole further substituents at most one to two sulfonic acid groups, and wherein the aryl is from mononuclear to binuclear, and (C) the imino group as a divalent bridge member being linked to (A) with one of its free valences in replacement of one of the four chlorine atoms of said 2,4,5,6-tetrachloropyrimidine, and with its other valence to a carbon atom of the aryl nucleus of the radical (B).

3. The dyestuff of the formula

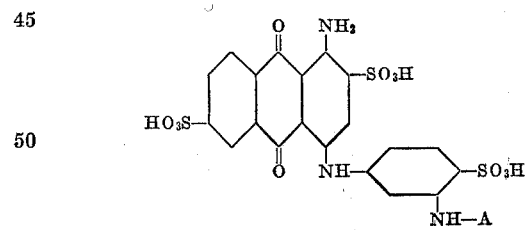

wherein A represents the trichloropyrimidyl residue of 2,4,5,6-tetrachloropyrimidine in which latter one chlorine atom is replaced by the bond to the adjacent NH group of the aforesaid formula.

4. The dyestuff of the formula

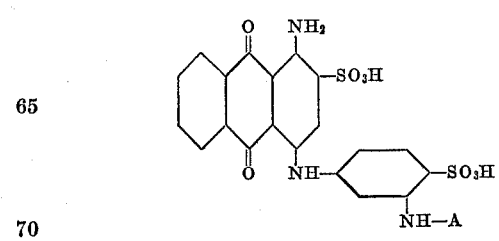

wherein A represents the trichloropyrimidyl residue of 2,4,5,6-tetrachloropyrimidine in which latter one chlorine atom is replaced by the bond to the adjacent NH group of the aforesaid formula.

5. Water-soluble anthraquinone dyestuff substituted by one group of the formula

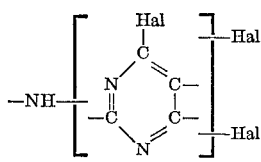

wherein Hal represents a halogen having an atomic number from 17 to 35, inclusive, the anthraquinone being 1-amino-2-sulfo-4-aryl-aminoanthraquinone bearing as sole further substituents at most one to two sulfonic acid groups and wherein the aryl is carbocyclic and at most binuclear, the said first-mentioned group being bound to a carbon atom of the aryl nucleus.

6. Water-soluble anthraquinone dyestuff substituted by one group of the formula

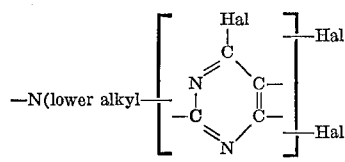

wherein Hal represents a halogen having an atomic number from 17 to 35, inclusive, the anthraquinone being 1-amino-4-arylaminoanthraquinone substituted with from two to three sulfonic acid groups and wherein the aryl is carbocyclic and at most binuclear, the said first-mentioned group being bound to a carbon atom of the aryl nucleus.

7. The dyestuff of the formula

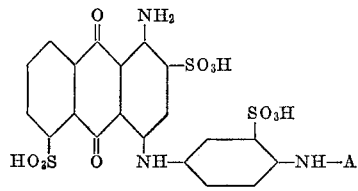

wherein A represents the trichloropyrimidyl residue of 2,4,5,6-tetrachloropyrimidine in which latter one chlorine atom is replaced by the bond to the adjacent NH group of the aforesaid formula.

8. A dyestuff of the formula

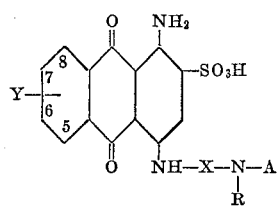

wherein:

A stands for trihalogenopyrimidyl,
R is a member selected from the group consisting of H and lower alkyl,
X is a bridge member selected from the group consisting of

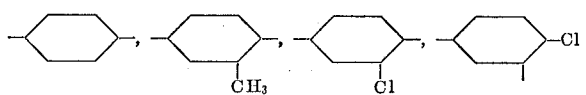

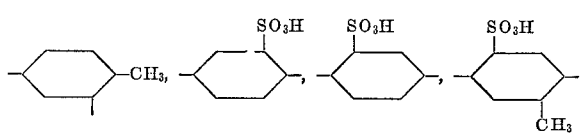

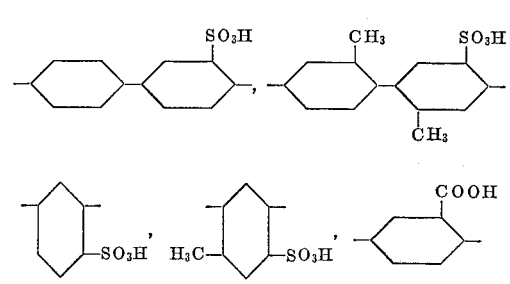

and
Y is a member selected from the group consisting of H, halogen and —SO$_3$H, of which the halogen can be in one of the positions 6 and 7 and the —SO$_3$H group can be in one of the positions 5, 6, 7 and 8.

References Cited
UNITED STATES PATENTS

| | | | |
|---|---|---|---|
| 2,935,506 | 5/1960 | Heslop et al. | 260—256.5 |
| 2,792,397 | 5/1957 | Ebel et al. | 260—256.5 |
| 2,876,222 | 3/1959 | Bloom | 260—256.5 |
| 2,918,344 | 12/1959 | Jenny | 8—39 |
| 2,900,216 | 8/1959 | Schwechten et al. | 8—39 |
| 1,886,480 | 11/1932 | Haller et al. | 260—153 |
| 3,035,058 | 5/1962 | Guenthard | 260—256.5 |

ALEX MAZEL, Primary Examiner
R. J. GALLAGHER, Assistant Examiner

U.S. Cl. X.R.
8—32, 33, 39, 40; 260—39